United States Patent [19]

Myers

[11] Patent Number: 4,601,094
[45] Date of Patent: Jul. 22, 1986

[54] TURNING MACHINE WITH AN AUTOMATIC TOOL CHANGER

[75] Inventor: Carl J. Myers, Mentor, Ohio

[73] Assignee: The Warner & Swasey Company, Cleveland, Ohio

[21] Appl. No.: 604,700

[22] Filed: Apr. 27, 1984

[51] Int. Cl.[4] .............................................. B23Q 3/16
[52] U.S. Cl. .................................................... 29/568
[58] Field of Search .................... 29/568, 26 A; 414/1

[56] References Cited

U.S. PATENT DOCUMENTS

| | | | |
|---|---|---|---|
| 3,355,799 | 12/1967 | Daugherty | 29/568 |
| 3,520,050 | 7/1970 | Trebble | 29/568 |
| 3,587,360 | 6/1971 | Oxenham | 29/568 X |
| 3,590,463 | 7/1971 | Burroughs et al. | 29/568 X |
| 4,457,659 | 7/1984 | Watanabe | 29/568 X |

*Primary Examiner*—Eugene F. Desmond
*Attorney, Agent, or Firm*—H. G. Massung; R. J. Eifler

[57] ABSTRACT

A turning machine (10) having a tool changer (70) capable of automatically changing O.D. and I.D. tools. A tool block system which supports the various tools is utilized. The tool changer (70) has a pair of fingers (74) disposed at the end of a cross arm (72). Fingers (74) are independently movable for engaging O.D. tooling blocks (32) and I.D. tooling blocks (33). Cross arm (72) is indexable to positions for installing the gripped tooling blocks (32,33) onto tool turret (16) or a tool storage magazine (60). A gauge mechanism (80) which pivots a touch probe (82) into the machine tool cutting plane is provided for accurately locating the position of various cutting tools. Offset of the tool cutting point from denominal position is compensated for software of the machine tool controller (22). Probe (82) can also be used in conjunction with another probe supported from turrets (16) for inprocess part gauging.

12 Claims, 28 Drawing Figures

4,601,094

TURNING MACHINE WITH AN AUTOMATIC TOOL CHANGER

BACKGROUND OF THE INVENTION

1. Technical Field

This invention relates to metal cutting machines and more particularly to turning machines having an automatic tool changer which can handle both O.D. and I.D. tooling.

2. Background Art

Machine tools having tool changers are well known in the art as exemplified by the constructions shown in U.S. Pat. Nos. 4,414,724; 4,404,727; 4,344,220; 4,343,077; and 4,300,278.

DISCLOSURE OF THE INVENTION

The present invention relates to a turning machine having a tool supporting turret and a tool storage means with a tool changing device located therebetween capable of changing O.D. and I.D. tooling. The tool turret is movable along two axes and supports a plurality of tool heads which can engage tool blocks holding the desired tooling. The tool blocks with various tools are supported in a tool storage drum or magazine. The tool changer is disposed between the tool turret and the tool storage drum. The tool changer is rotatable, by a three position actuator, between 0°, 90° and 180° positions and is also movable vertically along its rotational axis. A pair of fingers are provided at each end of the cross arm. Each pair of fingers is independently rotatable and can be raised and lowered along its rotational axis with respect to the cross arm.

The tool changer may be moved upward to a position to interface with the tool drum and the tool turret for removing a new tool from the drum and simultaneously removing the tool to be changed from the tool turret. A mechanism in the drum is operated to place a tool block, which supports the replacement tool, into the gripping fingers and the tool block on the turret which is engaged by the other pair of gripping fingers is released by operating a tool block release mechanism. The cross arm is then moved downward removing the tool blocks from the tool head mounted on the machine turret and storage drum. After the cross arm is lowered it is rotated 180° into position for installing the replacement tool block onto the tool head. The cross arm is then moved upward placing the new tool on the machine and the replaced tool into the storage drum.

The pair of fingers provided at the end of the cross arm are rotated to a first position for grasping the tool block and to a second position for installing a tool block, which supports an I.D. turning tool, onto a tool head on the turret. The fingers are also vertically positionable with respect to the cross arm for gripping tool blocks supporting O.D. or I.D. tools. If tool blocks supporting O.D. tools are to be changed the pair of fingers do not have to be rotated with respect to the cross arm during the changing operation.

A tool locating gage or probe is provided for accurately locating a tool when it is placed on the turret. Due to the construction of the tool block system the tool cutting point of a changed tool cannot be located exactly. The probe permits the tool cutting edge to be located very accurately after the tool is changed. The machine controller causes the tool to be brought into contact with the gauge. Variation of the tool point location from its nominal location are then compensated for in software. The probe can also be used for part gauging. The probe is pivoted into position during use and can be swung to a store position outside of the cutting area enclosure.

BRIEF DESCRIPTION OF THE DRAWINGS

For a better understanding of the invention, reference may be had to the preferred embodiment exemplary of the invention shown in the accompanying drawings in which.

BEST MODE FOR CARRYING OUT THE INVENTION

Figure 1:
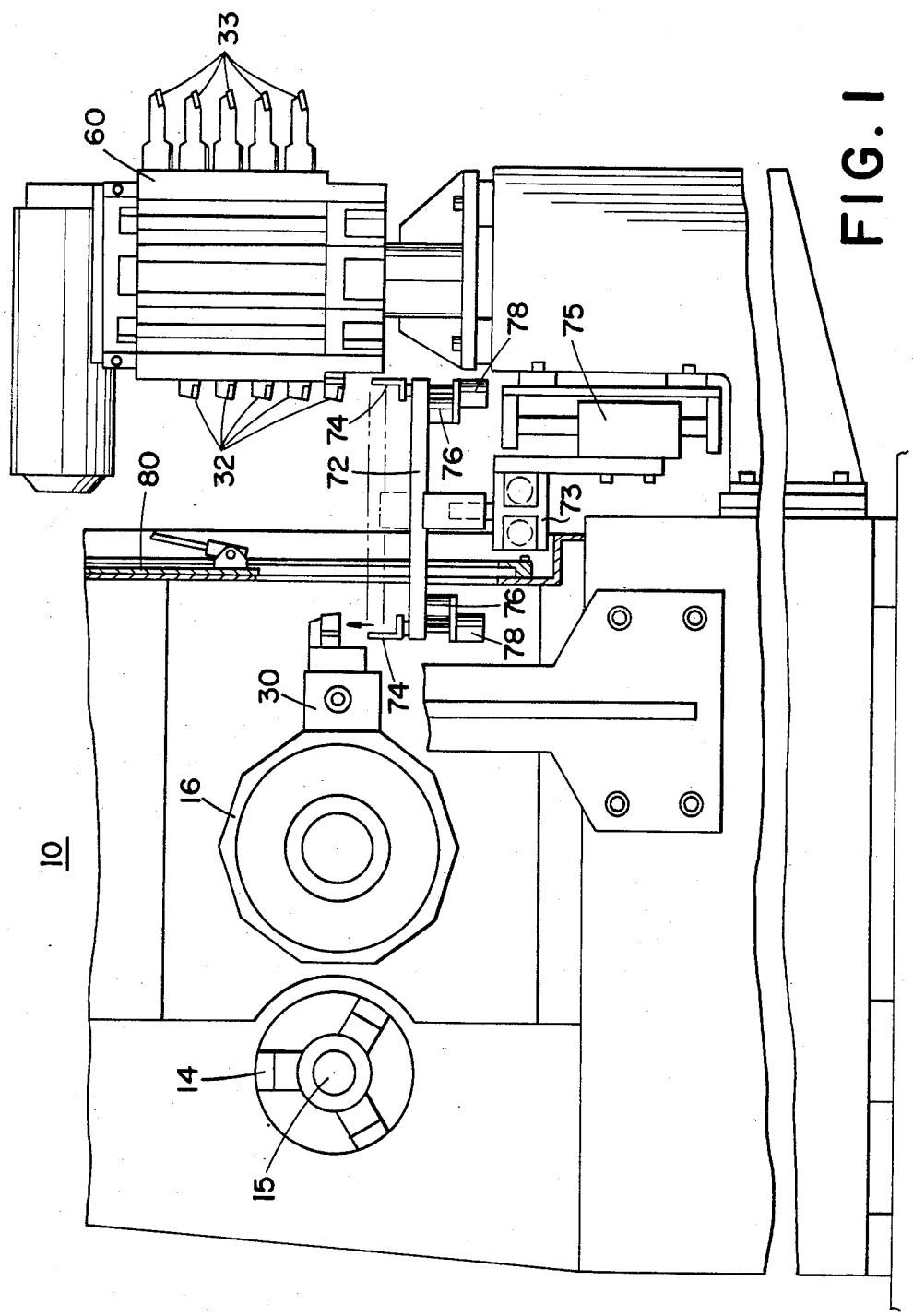
FIG. 1 is a view of a portion of a machine tool utilizing the teaching of the present invention.
Figure 2:
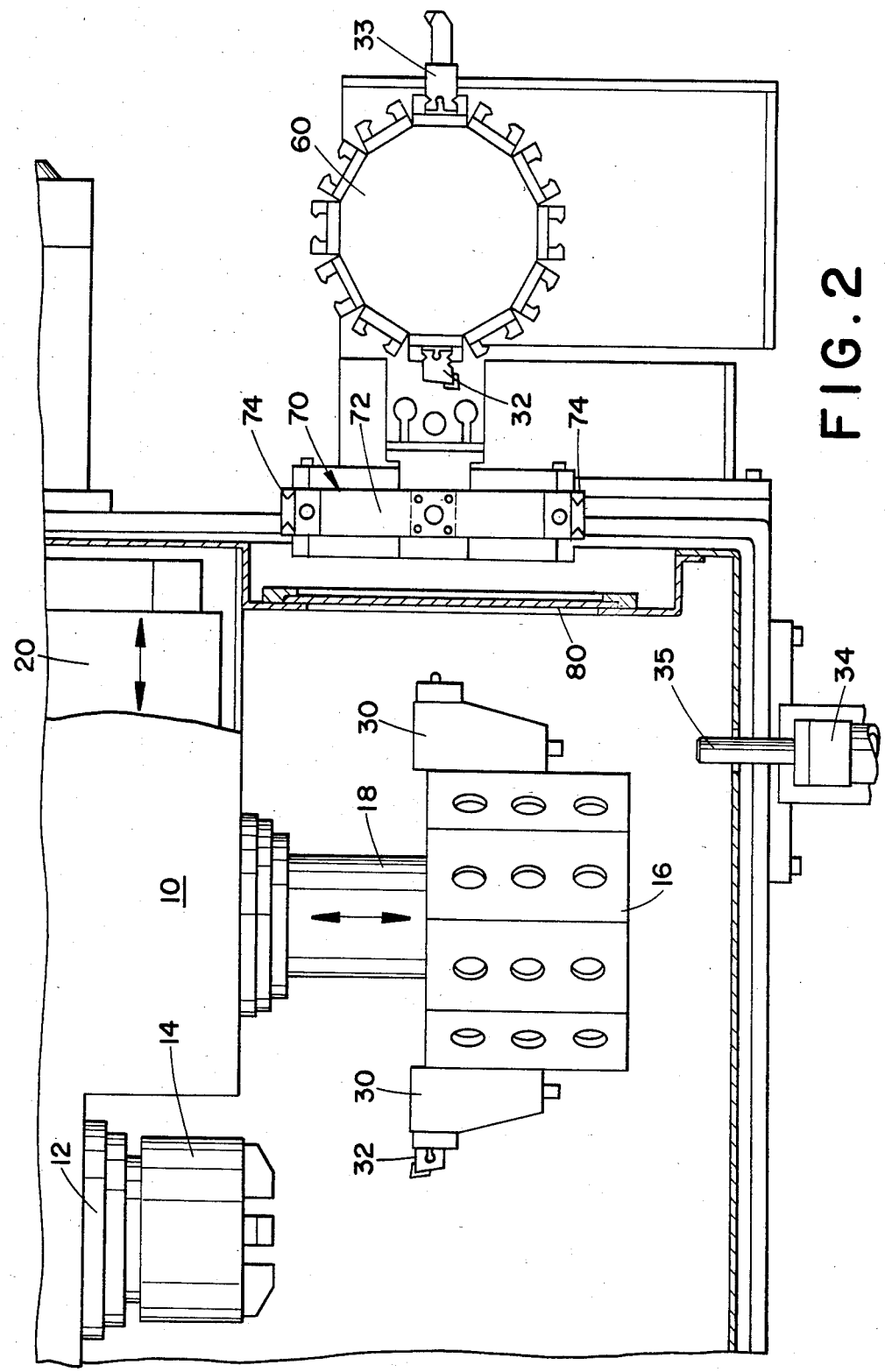
FIG. 2 is a top view of the machine tool position shown in FIG. 1.
Figure 19:
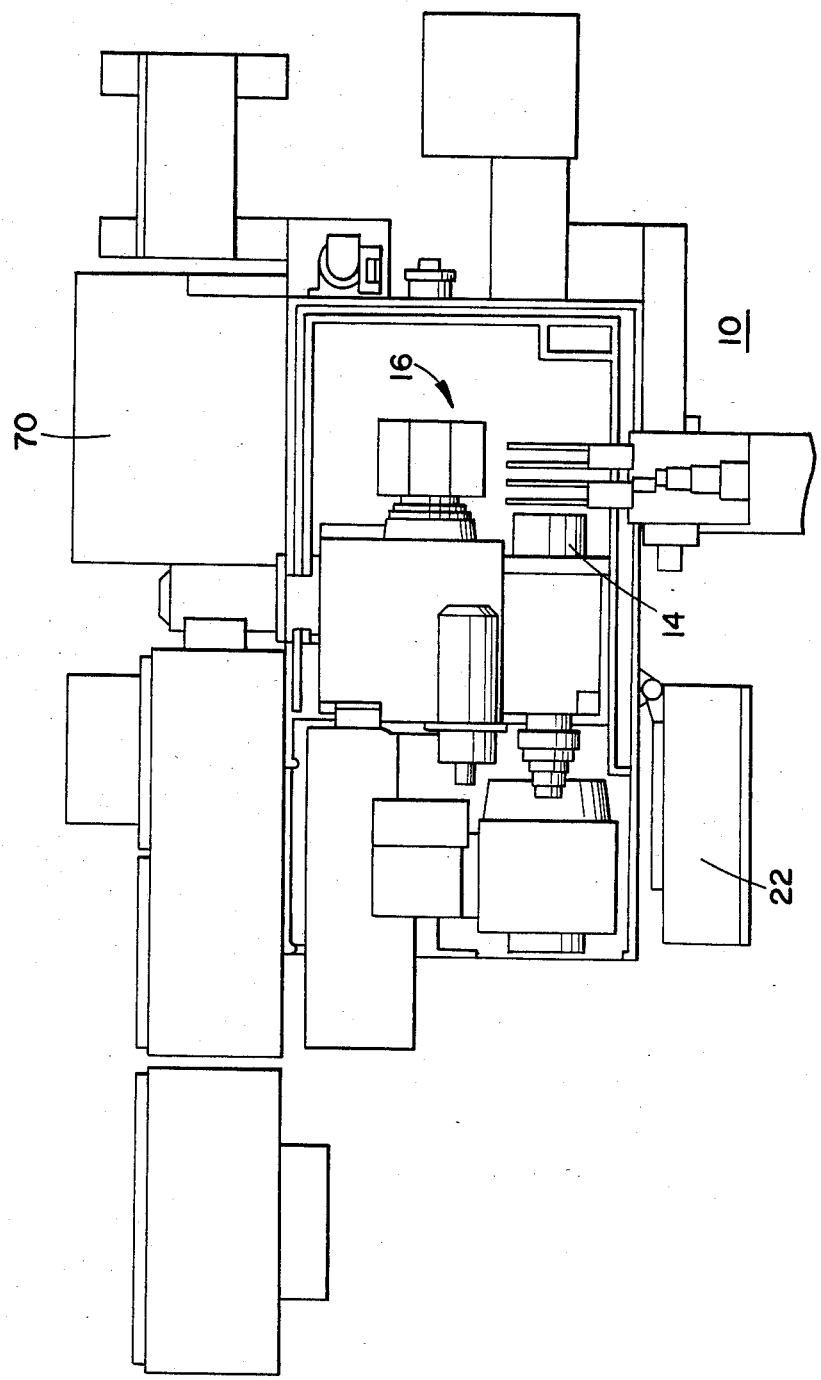

Referring now to the drawings and FIGS. 1, 2 and 19 in particular there is shown a turning machine tool 10 utilizing the teaching of the present invention. Turning machine 10 includes a driven spindle 12 supporting a chuck 14, rotatable around axis 15, which grips the workpiece to be machined. A tool turret 16 which is rotatably indexable to bring various tools into position for machining a workpiece is provided. Tool turret 16 is supported by a turret bar 18 which is movable in and out. Turret bar 18 is supported by a carriage 20 which is movable towards and away from spindle 12 and chuck 14. Turret bar 18 and carriage 20 are movable simultaneously and independently in response to signals from a controller 22 for two axes movement of tool turret 16. Controller 22 is a commercialily available CNC unit well known in the art.

Figure 5:
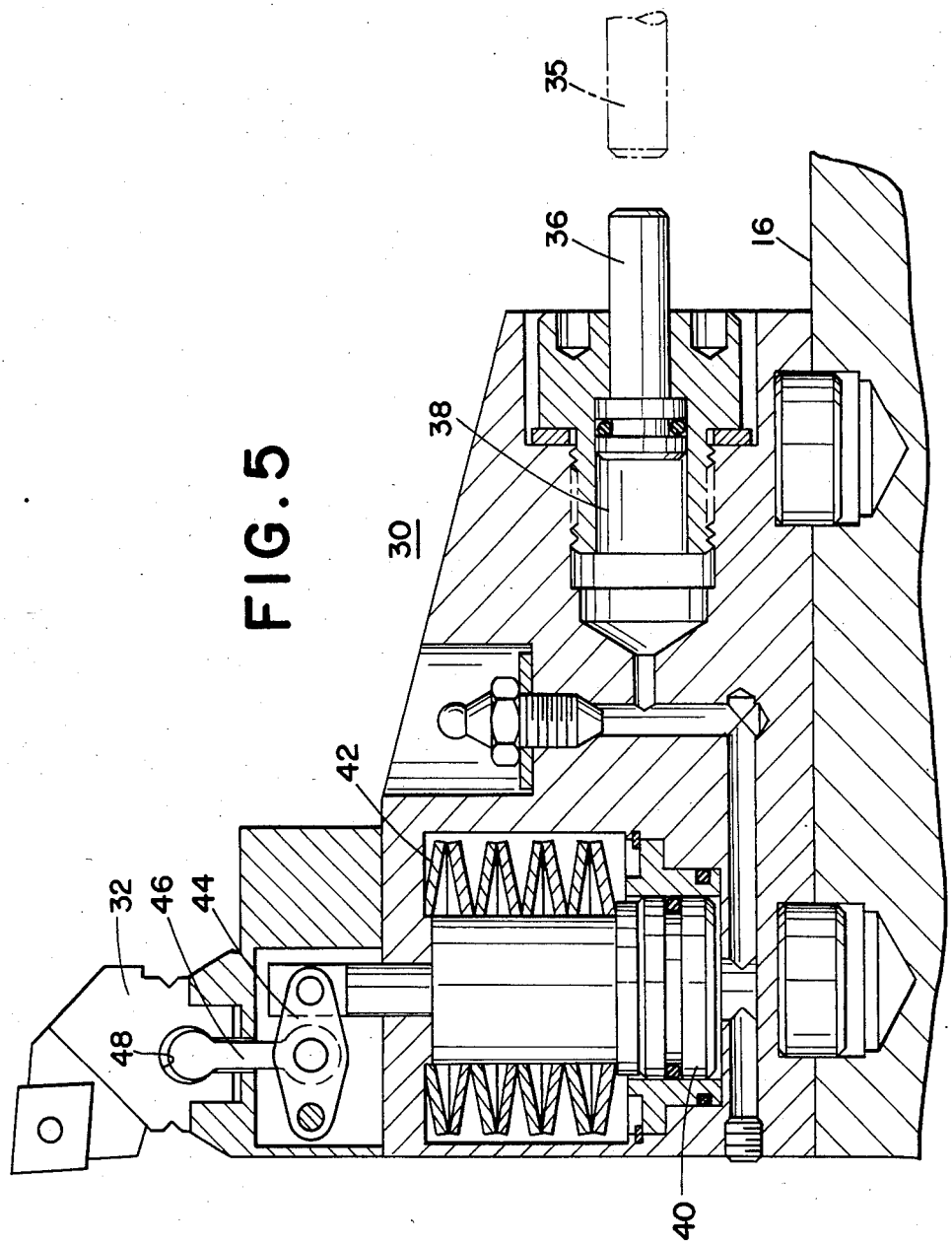
FIG. 5 is a section view of a tool head.

Tool turret 16 has ten faces and supports a plurality of tool heads 30 each of which can engage a tool block 32. A detailed section view of a tool head 30 is shown in FIG. 5. Each tool head 30 is securely attached to a face of tool turret 16. An unclamp tool cylinder 34 is provided for releasing a tool block 32 held by tool head 30. Unclamp tool cylinder 34 has a rod 35 which when moved to an extended position engages piston and rod 36. Piston 36, which is a part of tool head 30, releases tool block 36 when depressed. During operation the unclamp tool cylinder 34 forces piston 36 inward and fluid which is contained in interconnecting passages 38 forces piston 40 upward compressing belville washers 42 and raising one end of lever 44 to release tool block 32. Lever 44 moves an arm 46 which has an expanded head which can fit into an opening 48 in tool block 32. When lever 44 is moved outward arm 46 moves forward into opening 48 permitting tool block 32 to be removed. With unclamp tool cylinder 34 retracted Belleville washers 42 move piston 40 downward and retract arm 46. With a tool block 32 in place as arm 46 retracts the tool block 32 is securely held in position.

Figure 6:
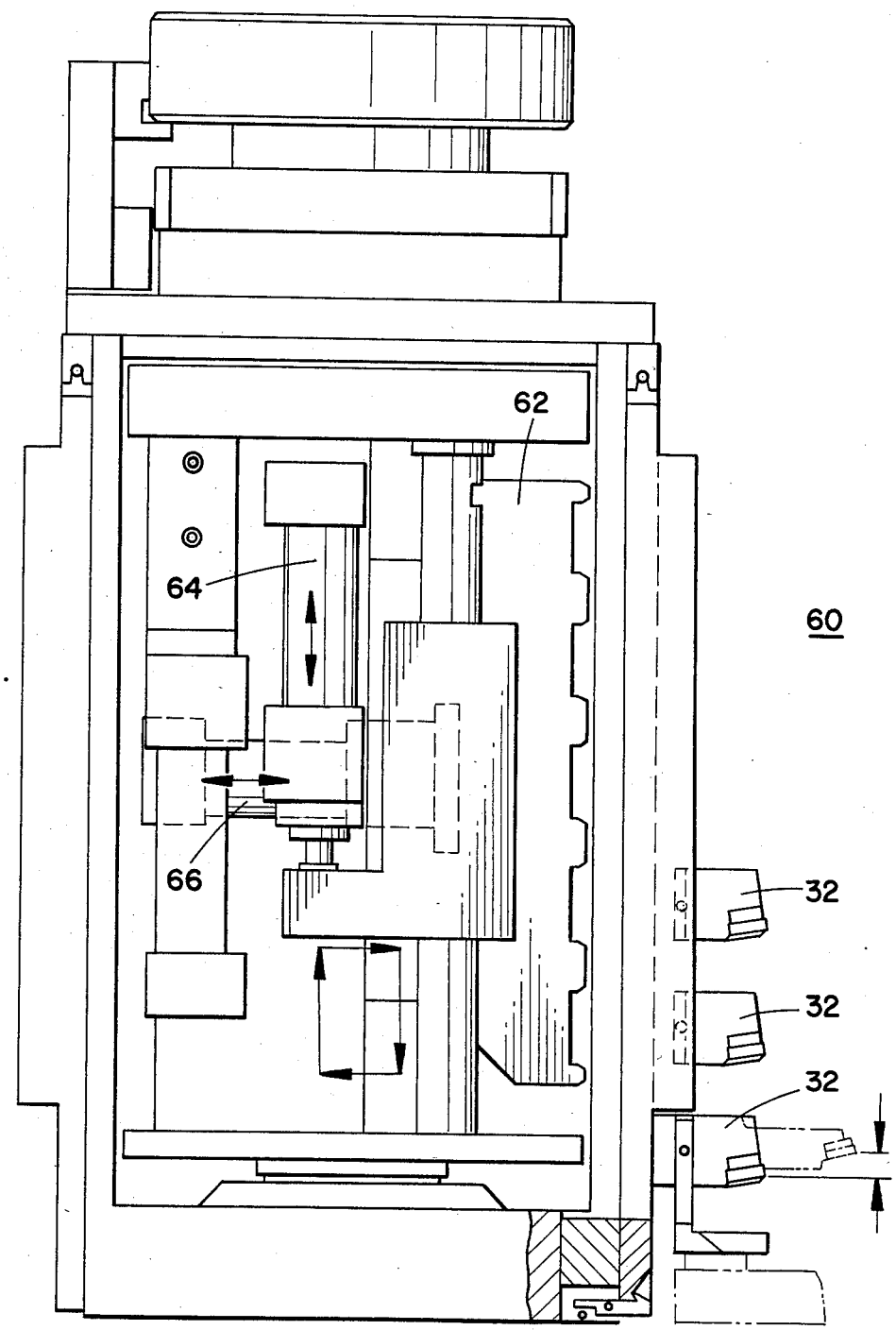
FIG. 6 is a view, with portions removed for clarity of the tool storage drum.

Referring now to FIG. 6 there shown a tool storage drum 60 which is commercially available from Sandvik Co., Model No. BT-25, system which supports a plurality of tool blocks 32, 33 manufactured by Sandvik. The Sandvik BT system consists of: (1) a rotatable drum 60 with tool magazines and capable of inserting or extracting tools from a tool changer device; (2) various tool block 32,33 cutting heads; and (3) a tool clamping system. A 25 mm block tool system was used but a 32 BT or 40 BT system available from Sandvik can also be used. Tool blocks 32 support O.D. turning tools and tool blocks 33 support I.D. turning tools. Tool drum 60 includes a comb 62 which is positioned along two axes by cylinders 64 and 66. When a tool is to be removed from drum 60 comb 62 is moved outward by cylinder 66 and then downward by cylinder 64 to bring a tool block 32 into position to be gripped by a tool changer 70. With fingers 74 properly positioned comb 62 moves tool block 32, 33 downward, tool block 32, 33 is moved into an engagement with the positioned pair of fingers 74 supported by the tool changer 70. When the tool block 32, 33 is to be taken from tool changer 70 into storage drum 60 comb 62 is moved downward then outward to engage the positioning tool block 32, 33. Comb 62 then is moved upward bringing the tool block 32, 33 into storage position on drum 60.

Figure 3:
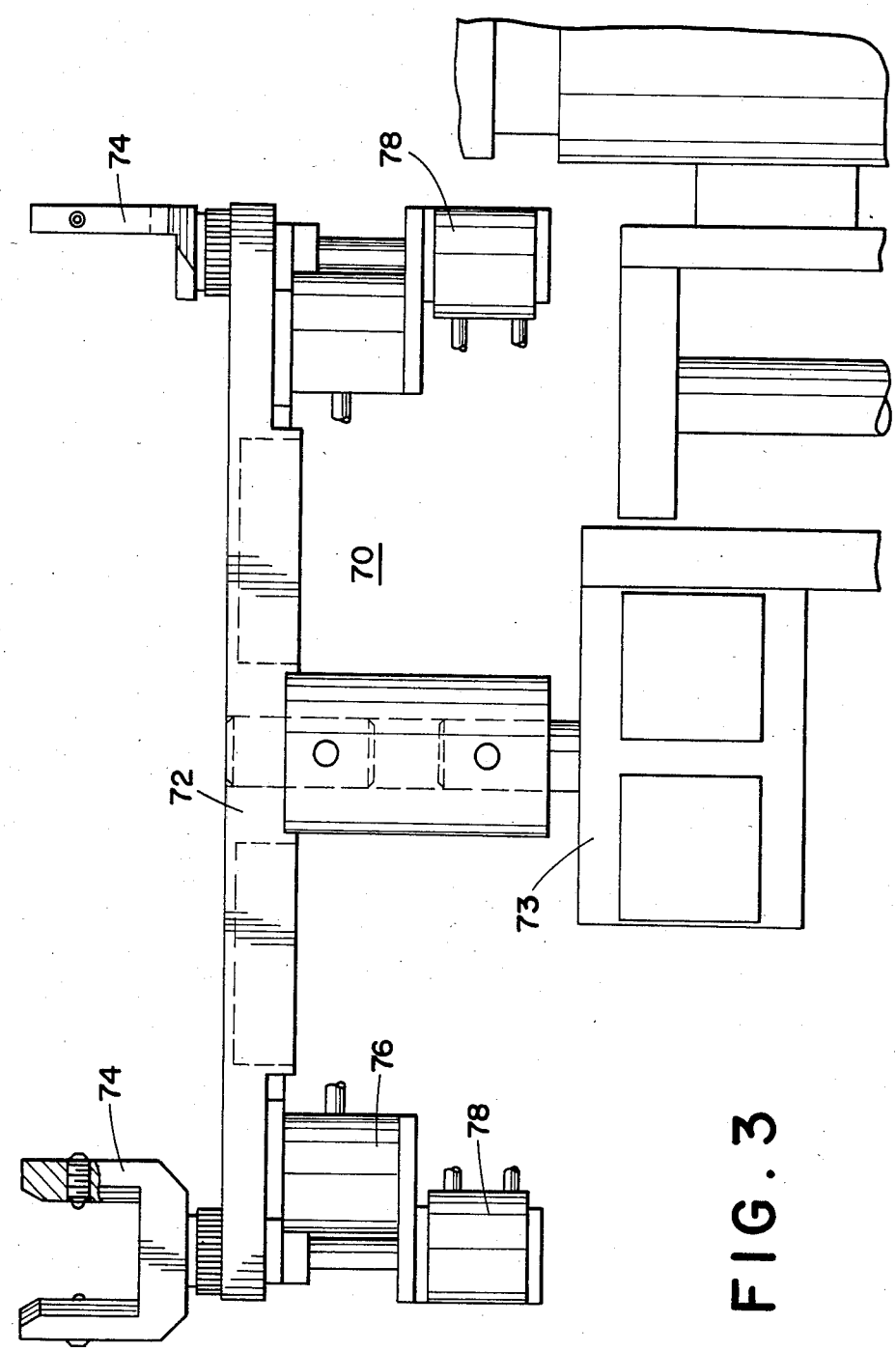
FIG. 3 is a view of the tool changer.
Figure 4:
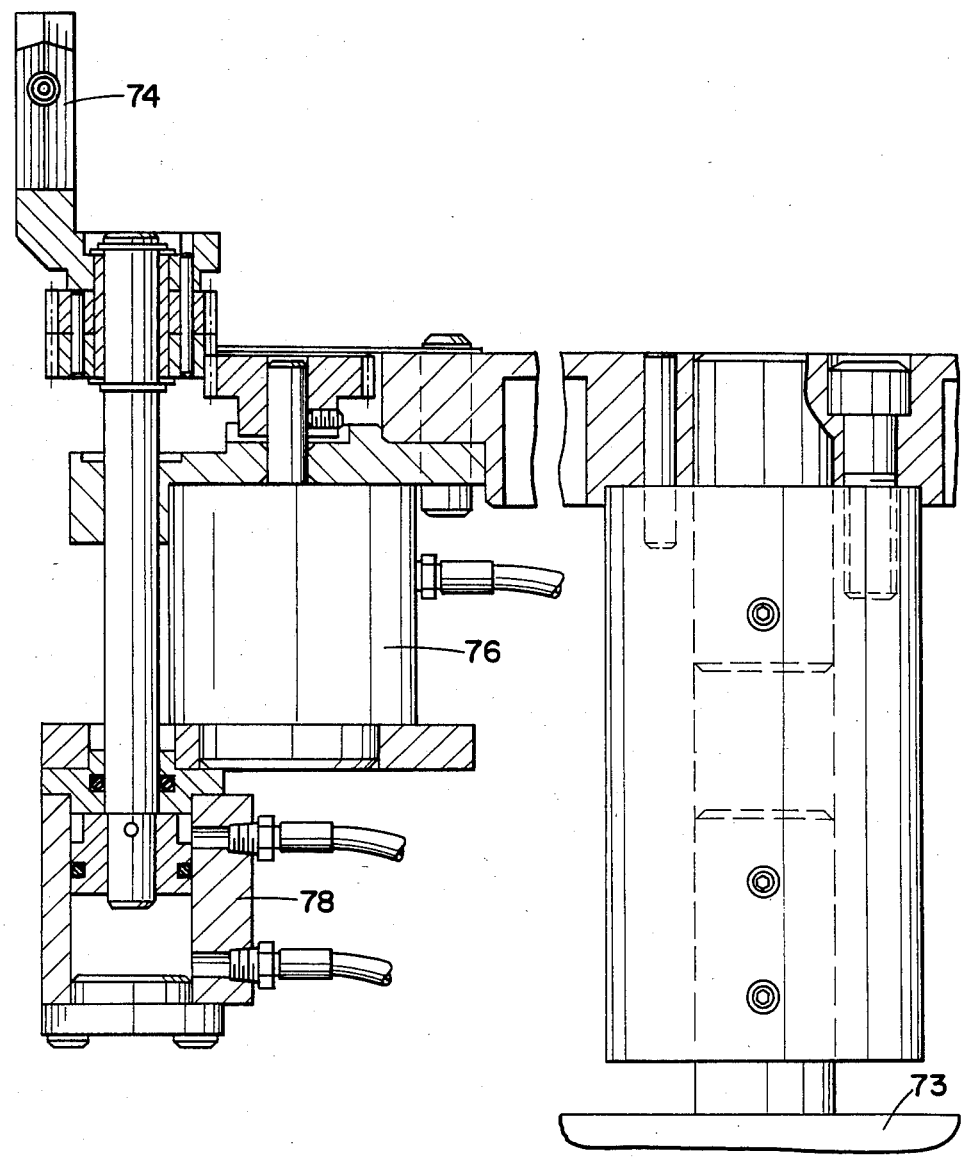
FIG. 4 is a section view of a portion of the tool changer showing the rotary actuator and lift cylinder for positioning the pair of fingers.

Tool changer 70 includes a cross arm 72 which can be positioned at 0°, 90° and 180° positions by a rotary actuator 73. Three position rotary actuator 73 is supported from a power slide 75 for moving cross arm 72 up and down. Power slide 75 operates under commands from controller 22. A pair of fingers 74 are provided at each end of cross arm 72. Rotary actuators 76 are provided for positioning fingers 74 at two positions which are 90° apart as shown in FIG. 3. Actuator 76 can position fingers 74 at either of the two positions shown. Lifting cylinders 78 is provided for raising and lowering fingers 74. Fingers 74 are raised or lowered with respect to cross arm 72 to accomodate different tooling blocks used. A door 80, which can be slid upward as shown in FIG. 1, separates, when closed, the tool changing mechanism 72 from tool turrent 16. When a workpiece is being machined, door 80 is kept closed to maintain debris such as the chips and cutting fluid within the cutting area enclosure of machine tool 10.

Figure 7:
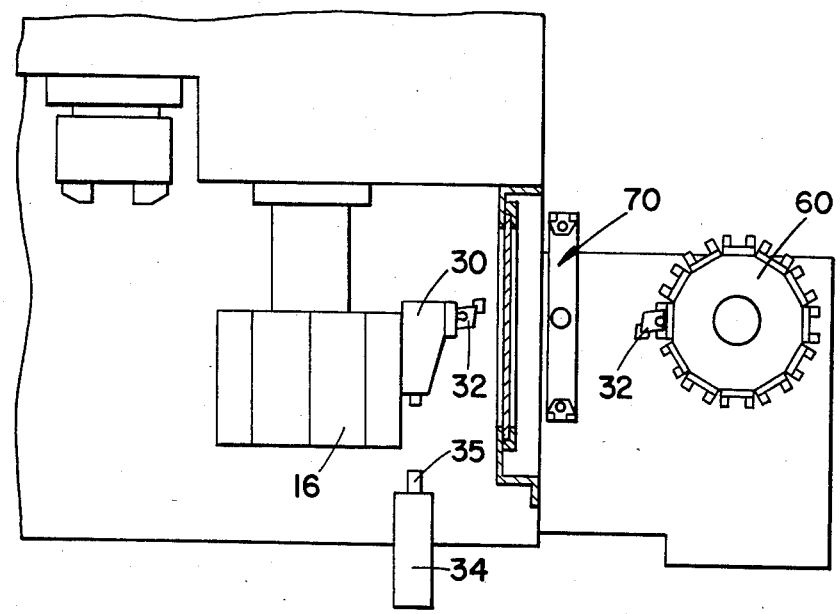
FIGS. 7–10 diagrammatically show operation of the tool changer.
Figure 8:
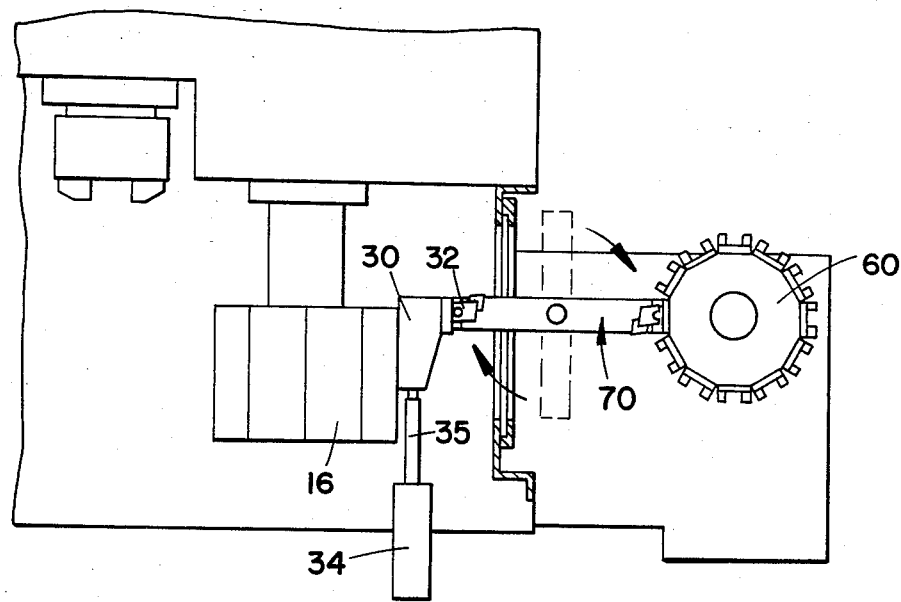
Figure 9:
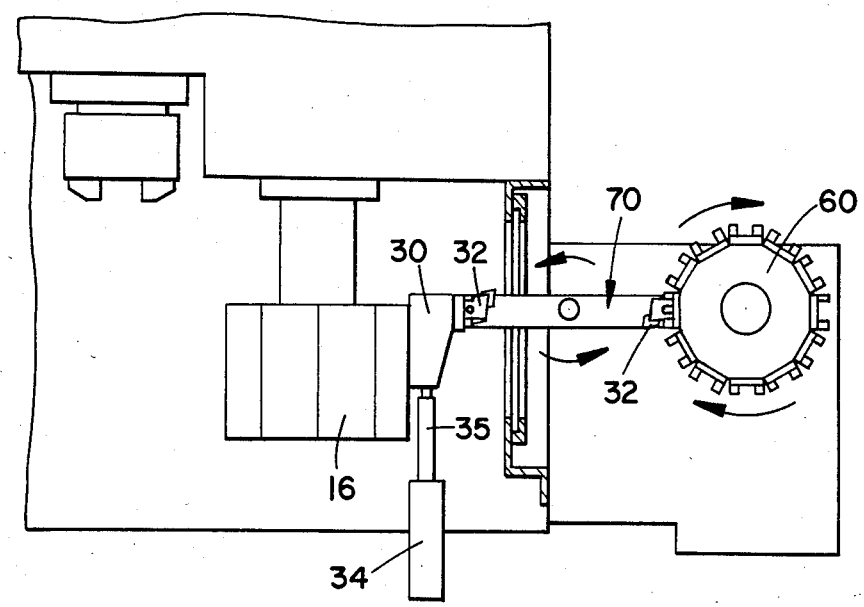
Figure 10:
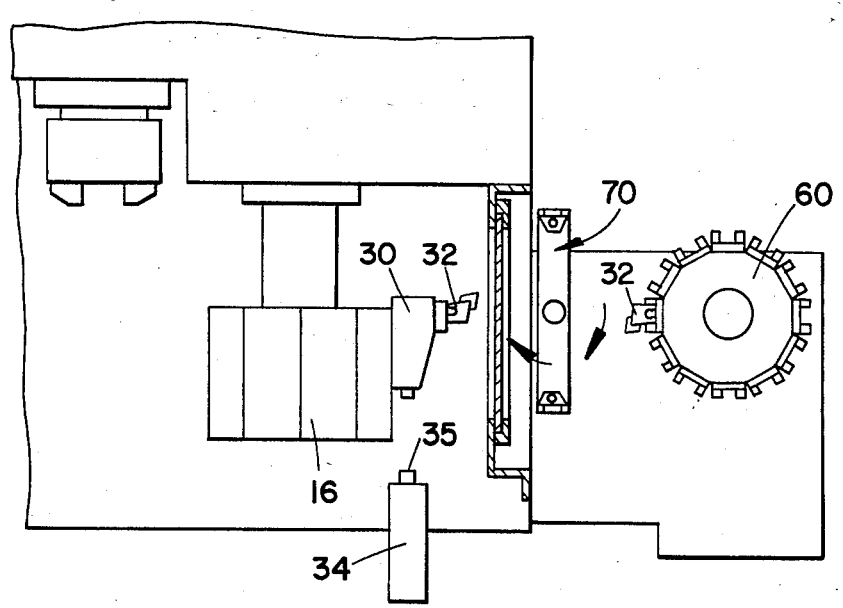

Referring now to FIGS. 7-10 there is shown the sequence for changing O.D. tool blocks 32. Initially, door 80 is closed and tool changer 70 is in the store position as shown in FIG. 7. Tool turrent 16 is rotated to bring the tooling block 32 which is to be changed into the proper position. At the same time tooling drum 60 is rotated to bring the replacement tooling block 32 into position. Door 80 then opens and arm 70 rotates 90° clockwise into position for receiving the two tool blocks 32. Power slide 75 then raises arm 70 so that fingers 74 engage tool block 32 on turret 16 and fingers 74, at the opposite end of arm 72, are moved into position to receive tool block 32 on drum 60. Comb 62 in drum 60 then cycles to move a tool block 32 downward into gripping fingers 74. While the replacement tool block 32 is being positioned into fingers 74 unclamp cylinder 34 is extended to release the tool block 32 which is held in a tool head 30 supporting a Sandvik tool clamping system on turret 16. Cross arm 72 then moves downward removing the replacement tool from drum 60 and also the old tool from tool head 30. Drum 60 then cycles to bring a storage magazine into position to receive the replaced tool. Arm 72 is rotated counterclockwise 180°, by actuator 73, bringing the replacement tool into position with respect to tool turret 16 and the old tool into position with respect to drum 60. While arm 72 is being positioned unclamp cylinder 34 continues to engage the release button on tool head 30. With arm 72 in proper position, with respect to turret 16 and storage drum 32, power slide 75 raises cross arm 72 bringing the replacement tool block 32 into position on tool head 30 and the old tool block into a storage position with respect to drum 60. The unclamped cylinder then retracts and the comb on drum 60 cycles to engage the old tool and raise it into the magazine storage position. Arm 72 is then lowered and rotated 90° to a store position as shown in FIG. 10 and door 80 is closed. Machine tool 10 can then operate to machine a workpiece. Alternately before door 80 closes turret 16 and drum 60 can index to another position for another tool change sequence.

The fingers 74 provided at opposite ends of cross arm 72 are rotatable 90° with respect to cross arm 72. The fingers can also be raised and lowered with respect to cross arm 72. During changing of a tool block 33 holding an I.D. working tool the fingers are rotated 90° and are lowered by 10 millimeters. That is, when changing an I.D. working tool, by installing or removing the associated tool block 33 from tool turret 16, fingers 74 will be in position as shown in the left hand of FIG. 3. Fingers 74 on the right side of cross arm 72, as shown in FIG. 3, will be in position to engage a tool block 33 in drum 60. When cross arm 72 is lowered fingers 74, supporting the replaced tooling block 33 are rotated 90° for moving the tool block 33 into position to be taken into storage drum 60. Fingers 74 supporting the replacement tool block 33 are rotated 90° to a position for installing the I.D. tool block into an I.D. tool head.

Figure 11:
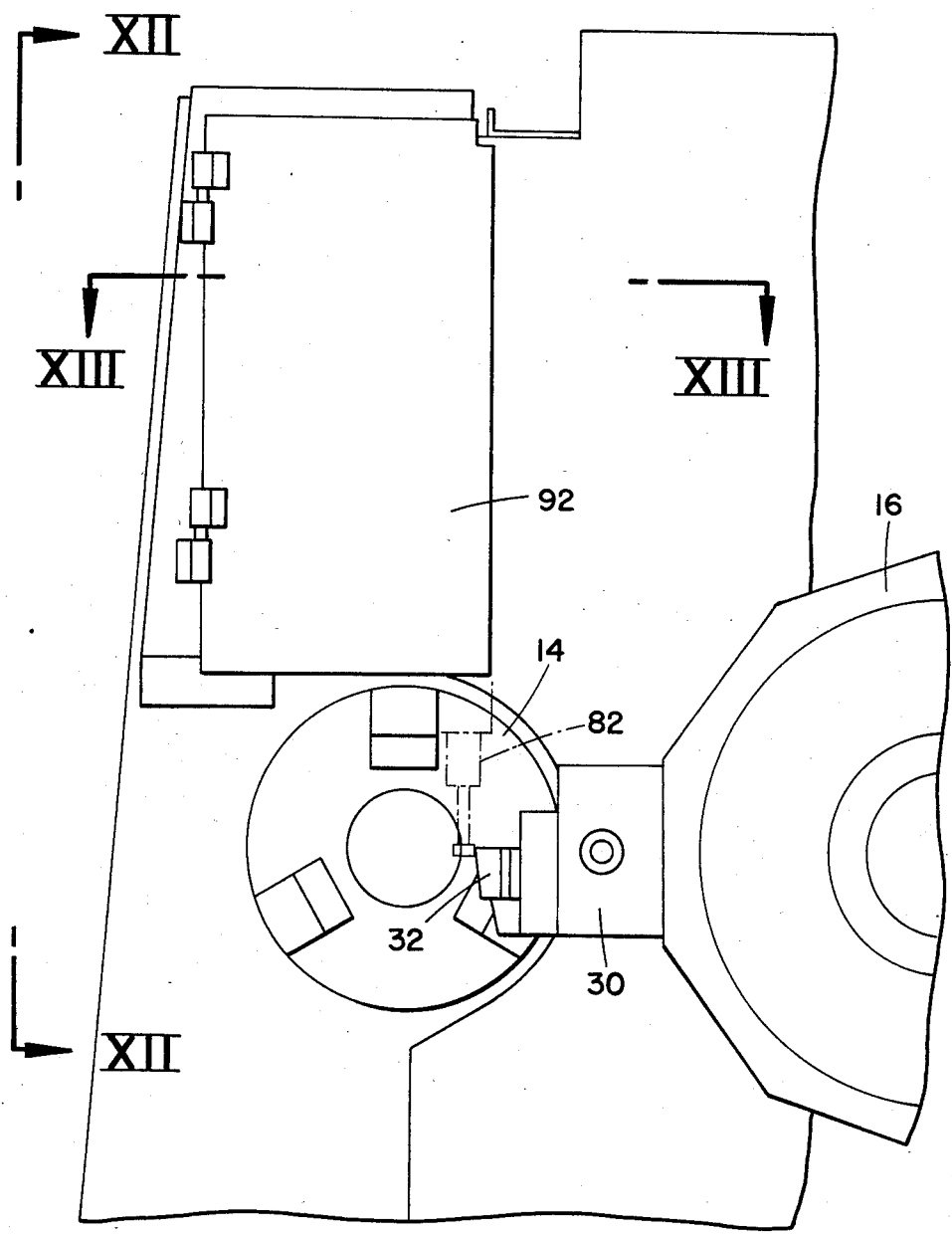
FIG. 11 is a view showing the probe cover and, in phantom, the probe tool gaging position.
Figure 12:
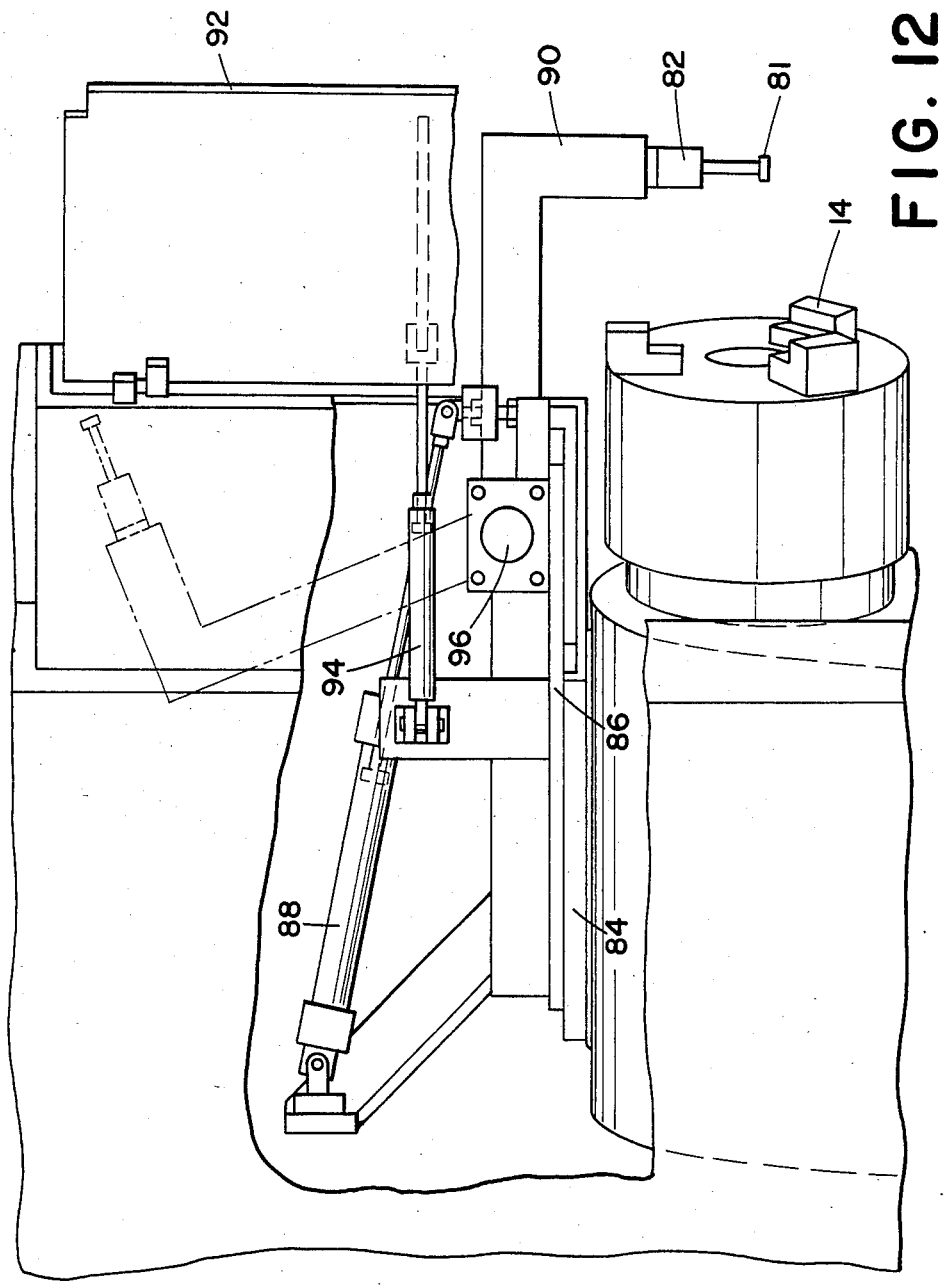
FIG. 12 is a side view of the tool probe pivot mechanism.
Figure 13:
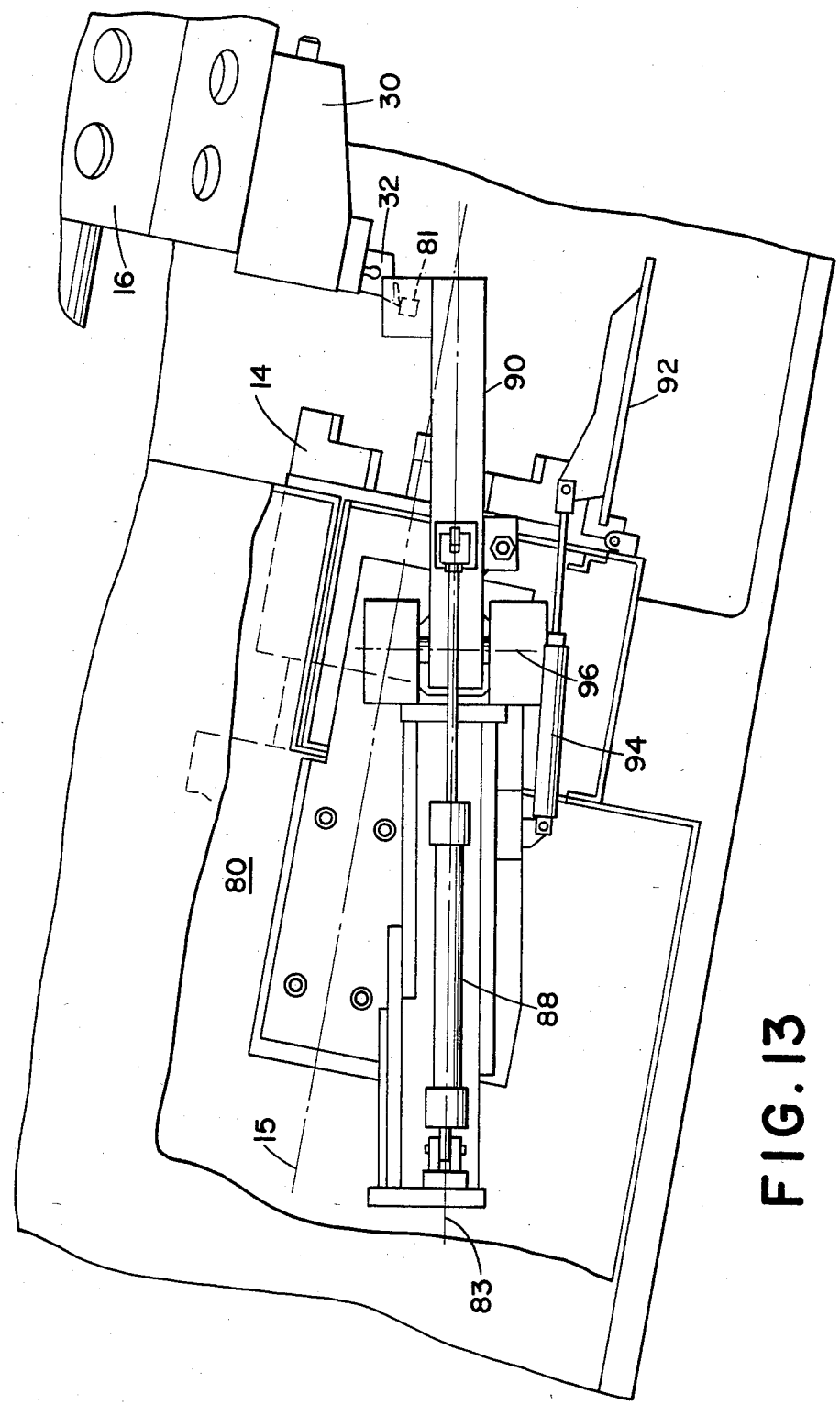
FIG. 13 is a top view of the tool probe pivot mechanism.
Figure 14A:
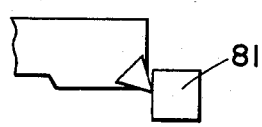
FIGS. 14a through 18c are diagrammatic views of various tooling arrangements during tool locating and cutting operations; and, FIG. 19 is a plan view of a turning machine on which the disclosed invention can be used.
Figure 14B:
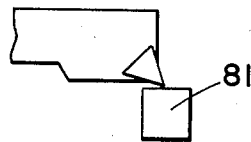
Figure 14C:
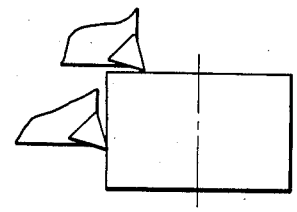
Figure 15A:
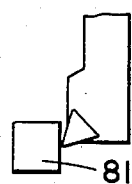
Figure 15B:
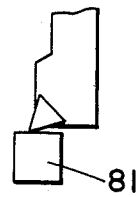
Figure 15C:
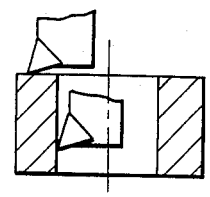
Figure 16A:
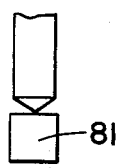
Figure 16B:
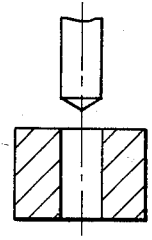
Figure 17A:
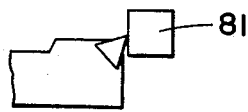
Figure 17B:
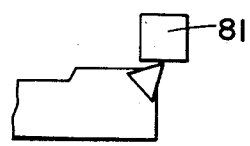
Figure 17C:
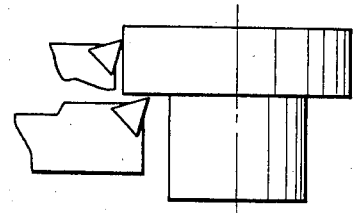
Figure 18A:
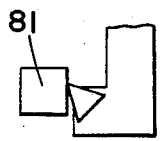
Figure 18B:
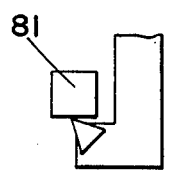
Figure 18C:
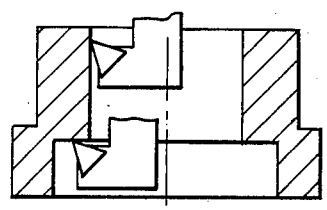

Referring now to FIGS. 11 through 13 there is shown a swing out tool gage and datum used for accurately locating tools which are held by tool blocks 32, 33. The swing out tool gage and datum consist of a mechanism with one degree of freedom, for accurate location, which pivots a touch trigger probe 82 into the cutting plane of the machine. Touch trigger probe 82 is commercially available from Renishaw Electric Ltd., Gloucestershire, England. In the stored position, the touch trigger probe 82 is outside the cutting enclosure to avoid contact with the cutting chips and debris. The probe 82 is introduced into the cutting plane to determine the location of the tool point relative to the spindle centerline. The probe can provide for accurate locating of the cutting tip radially and longitudinally. The probe also can provide a datum for an inprocess part gage which is supported from turret 16 of the machine tool 10. Both of these functions are enhancements to the turning machine 10 which are necessary components for an unmanned turning center.

The tool gage provides a closed loop system which will replace an open loop touch-off post used on prior art machines for longitudinal location of I.D. tools. In addition as shown in FIGS. 14a through 18c various O.D. and I.D. turning tools can be located in both radial and longitudinal directions.

In order for the cutting edge of a turning tool to be properly located the CNC control must know the type of tool which will be gaged. Five different type of tools which can be gaged are O.D. tools, I.D. tools, drills, O.D. backface tools or I.D. backface tools. The controller commands the correct approach sequence to gage the particular tool. Variations of the tool cutting point location from its nominal location will automatically be compensated for by changing the tool offset in the controller 22 software.

The tool gage concept is especially important when using the described quick tool change system with its block tooling. During a tool change sequence the tool changer 70 can locate the tool point within approximately 0.008 inches of its nominal location. This difference could result in part diameter variation of up to 0.016 inches when tools are interchanged. A variation of this magnitude is not acceptable on a turning machine. The disclosed gage 80 is used to determine the location of the tool cutting point very accurately and to compensate in software for any variation from its nominal location. The pivotal gage 80 can also be used to locate a part gage carried on the tool turret 16 relative to the spindle centerline. Changes in location of the part gage result from thermal effect on the machine structure and on the slides ballscrew. Since the tool gage swings in from behind the spindle, at a slight angle relative to the spindle centerline, thermal growth in the radial direction will be almost negligible and this makes the gage a good datum surface.

Probe 82 has a square touch finger 81. As shown in FIGS. 14a through 18c the different tools touch various faces on the square tip 81 of probe 82 for locating of the cutting tip both radially and longitudinally. Touch probe 82 is supported by an arm 90 which is pivotally mounted from a tool gage base 86. Tool gage base 86 is supported on a tool mounting plate 84. Arm 90 is pivotable about pivot axis 96 by pivot cylinder 88. The aligned centerlines of pivot arm 90 and pivot gage 88 extend along the centerline 83 which is offset slightly from the centerline 15 of spindle 16. The square tip 81 is aligned however with its sides parallel or perpendicular to the spindle centerline axis 15. The probe 82 is pivotal into and out of the cutting plane by operation of pivot cylinder 88. When probe 82 is in the store position cover 92 is closable over the opening through which pivot arm 90 can extend. Cover 92 is positioned to the open or closed position by cylinder 94.

Having thus described the invention, what is claimed is:

1. A machine tool having a tool turret for supporting a tool, storage means for storing a plurality of tools and a tool changer comprising:
   an elongated cross arm having a longitudinal axis and a central axis perpendicular to said longitudinal axis, said cross arm supported intermediate its ends for rotation about its central axis;
   a pair of gripping fingers disposed at each end of said cross arm, each pair of fingers extending parallel to a central axis that is parallel to the central axis of the cross arm; and
   means for rotating each pair of gripping fingers around its central axis.

2. A machine tool as claimed in claim 1 comprising:
   means for axially moving each pair of fingers back and forth along its central axis.

3. A machine tool as claimed in claim 2 comprising:
   power slide means connected to said cross arm for axially moving said cross arm back and forth along its central axis.

4. A machine tool as claimed in claim 1 comprising:
   a door, which can be opened or closed, disposed between said tool turret and said storage means; and
   said cross arm is rotatable between a first position, wherein a portion of said cross arm extends through said door opening from said tool storage side of the door to said tool turret side of the door, and a second position wherein said entire cross arm is on said tool storage side of the door.

5. A machine tool as claimed in claim 1 comprising:
   clamp actuating means for releasing or securing a tool to said tool turret when the tool is supported by a pair of gripping fingers.

6. A machine tool as claimed in claim 5 comprising:
   power slide means connected to said cross arm for raising and lowering said cross arm.

7. A machine tool as claimed in claim 1 comprising:
   a spindle and chuck for holding a workpiece, said spindle and chuck mounted for rotation about their longitudinal axis; and
   a probe supported to be engaged by a tool for determining to a high degree of accuracy the location of the tool cutting tip relative to at least the longitudinal axis of the spindle when the tool is in a position to cut a workpiece mounted in the chuck.

8. A turning machine comprising:
   a driven spindle;
   tool turret means movable along two axes for supporting a plurality of tool blocks;
   tool storage means for storing a plurality of tool blocks;
   an elongated cross arm disposed between said tool turret means and said tool storage means, said cross arm having a longitudinal axis and a central axis perpendicular to said longitudinal axis;
   a pair of gripping fingers disposed at each end of said cross arm, each pair of fingers extending parallel to a central axis that is parallel to the central axis of the cross arm and capable of gripping one of the tool blocks;
   means for rotating each pair of gripping fingers around its central axis;
   means for supporting and rotating said cross arm around its central axis to predetermined positions; and
   means for axially moving said cross arm back and forth along its central axis.

9. A turning machine as claimed in claim 8 wherein said tool turret means comprises:
   a tool turret having a plurality of faces; and
   a plurality of tool heads each attached to a respective face of said tool turret and adapted to receive and retain a respective tool block.

10. A turning machine as claimed in claim 9 comprising:
    release pin means in said tool head for releasing each tool block from its respective tool head; and,
    a release cylinder operable between a retracted position and an extended position that engages and depresses said release pin means to release a tool head.

11. A turning machine as claimed in claim 8 comprising:

actuator means associated with each pair of fingers for axially moving each pair of fingers back and forth along its central axis.

12. A turning machine as claimed in claim 8 comprising:
a housing disposed around said driven spindle and said tool turret means;
an opening formed in said housing and located so that said cross arm can rotate to a first position, that extends a portion of said cross arm through said opening and into said housing, and to a second position that locates said entire cross arm outside of said opening and said housing; and
a door moveable to open and close said opening.

* * * * *